(12) United States Patent
Yoshitake et al.

(10) Patent No.: US 9,777,141 B2
(45) Date of Patent: Oct. 3, 2017

(54) SILICA-CONTAINING RESIN COMPOSITION AND METHOD FOR PRODUCING SAME, AND MOLDED ARTICLE PRODUCED FROM SILICA-CONTAINING RESIN COMPOSITION

(71) Applicant: NISSAN CHEMICAL INDUSTRIES, LTD., Tokyo (JP)

(72) Inventors: Keiko Yoshitake, Sodegaura (JP); Ichitaro Kikunaga, Sodegaura (JP); Ai Miyamoto, Sodegaura (JP); Megumi Shimada, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/896,070

(22) PCT Filed: Jun. 5, 2014

(86) PCT No.: PCT/JP2014/065017
§ 371 (c)(1),
(2) Date: Dec. 4, 2015

(87) PCT Pub. No.: WO2014/199904
PCT Pub. Date: Dec. 18, 2014

(65) Prior Publication Data
US 2016/0130425 A1    May 12, 2016

(30) Foreign Application Priority Data
Jun. 10, 2013 (JP) .................. 2013-122249

(51) Int. Cl.
C08K 3/36       (2006.01)
C08K 9/06       (2006.01)
C01B 33/145     (2006.01)
C08L 101/00     (2006.01)
C01B 33/141     (2006.01)
C01B 33/148     (2006.01)
C09C 1/30       (2006.01)

(52) U.S. Cl.
CPC .............. *C08K 9/06* (2013.01); *C01B 33/141* (2013.01); *C01B 33/145* (2013.01); *C01B 33/148* (2013.01); *C08K 3/36* (2013.01); *C08L 101/00* (2013.01); *C09C 1/3081* (2013.01); *C01P 2006/12* (2013.01); *C08K 2201/006* (2013.01)

(58) Field of Classification Search
CPC .................................... C08K 9/06; C08K 3/36
See application file for complete search history.

(56) References Cited

U.S. PATENT DOCUMENTS

2011/0217512 A1* 9/2011 Heishi .................... H05K 3/381
                                                           428/141

FOREIGN PATENT DOCUMENTS

| JP | H04-31311 A    | 2/1992  |
|----|----------------|---------|
| JP | H06-316407 A   | 11/1994 |
| JP | 2004-091220 A  | 3/2004  |
| JP | 2005-054129 A  | 3/2005  |
| JP | 2005-054130 A  | 3/2005  |
| JP | 2005-054131 A  | 3/2005  |
| JP | 2006-021948 A  | 1/2006  |
| JP | 2007-192866 A  | 8/2007  |
| JP | 2010-155750 A  | 7/2010  |
| JP | 2013-067545 A  | 4/2013  |

OTHER PUBLICATIONS

English language translation JP 2008-137854, Jun. 2008.*
Ströober et al., "Controlled Growth of Monodisperse Silica Spheres in the Micron Size Range," Journal of Colloid and Interface Science, 1968, vol. 26, pp. 62-69.
Aug. 26, 2014 International Search Report issued in International Patent Application No. PCT/JP2014/065017.

* cited by examiner

*Primary Examiner* — Margaret Moore
(74) *Attorney, Agent, or Firm* — Oliff PLC

(57) ABSTRACT

A silica-containing resin composition, characterized by containing a resin and silica particles in an amount of 5 to 300 parts by mass, with respect to 100 parts by mass of the resin, wherein the silica particles satisfy the following requirements (a) to (c): (a) the silica particles have a specific surface area, as determined through a nitrogen absorption method, of 20 to 500 m$^2$/g; (b) the silica particles have a percent moisture absorption of 5.0 mass % or less at a relative humidity of 50%; and (c) the silica particles contain substantially no metallic impurity or halogen.

11 Claims, No Drawings

SILICA-CONTAINING RESIN COMPOSITION AND METHOD FOR PRODUCING SAME, AND MOLDED ARTICLE PRODUCED FROM SILICA-CONTAINING RESIN COMPOSITION

TECHNICAL FIELD

The present invention relates to a silica-containing resin composition, to a method for producing the composition, and to a molded article of the silica-containing resin composition.

BACKGROUND ART

One conventional mode of use of silica sol is incorporation into a resin or resin material to thereby provide a curable resin composition. In such a case, silica sol is used for improving properties of resin products such as surface hardness, shrinkage after curing, thermal expansion property, heat resistance, and insulation performance. Silica sol is also used in combination with silica powder having a micron-order to a submicron-order particle size, the two silica components being incorporated into a resin so as to enhance dispersibility of the silica powder in resin and silica filling density, to thereby enhance performance of the resin products.

Hitherto, for years there has been known a method for producing silica sol for use in such a silica-containing resin composition, the method including neutralization or ion-exchange of water glass serving as a raw material. Also, it has been known that silica micropowder can be produced through pyrolysis of silicon tetrachloride. An alternative known method for producing a silica sol is based on hydrolysis of a silicon alkoxide in an alcoholic aqueous solution in the presence of a basic catalyst. In one reported method, a 0.28 mol/L tetraethyl silicate is added to an alcoholic solution containing several mol/L-order ammonia and several mol/L to 15 mol/L water, and the mixture is hydrolyzed, to thereby obtain silica particles having a diameter of 50 to 900 nm (see, for example, Non-Patent Document 1).

There has been also disclosed a method for producing a hydrophilic organic-solvent-dispersed, neutral silica sol having a metallic impurity level of 1.0 ppm or lower, the method including a step of hydrolyzing an alkoxysilane in an aqueous alcoholic solution (see, for example, Patent Document 1). Another disclosed silica sol production method includes hydrolysis of tetraethyl silicate in the presence of sodium hydroxide or a water-soluble amine as a hydrolysis catalyst (see, for example, Patent Document 2).

PRIOR ART DOCUMENTS

Patent Documents

[Patent Document 1] Japanese Patent Publication Laid-Open (kokai) No. 2004-91220
[Patent Document 2] Japanese Patent Publication Laid-Open (kokai) No. Hei 06-316407

Non-Patent Documents

Non-Patent Document 1: Journal of Colloid and Interface Science, Vol. 26 (1968), p. 62 to 69

SUMMARY OF THE INVENTION

Problems to be Solved by the Invention

However, when the method for producing silica sol through neutralization or ion-exchange of water glass serving as a raw material is employed, impurities such as metals and free anions cannot be completely removed. In the silicon tetrachloride pyrolysis technique, chlorine originating from silicon tetrachloride may remain as an impurity, in some cases, inside or outside (surface) the silica particles. Under such circumstances, difficulty is encountered in producing a high-purity silica-containing resin composition or a molded article therefrom (hereinafter, the article may be referred to as "cured resin product"). As a result, the formed silica sol cannot find specific uses where high purity is required; e.g., electronic material uses. In addition, since silica micropowder formed through pyrolysis of silicon tetrachloride is formed of aggregated silica particles, difficulty is also encountered in adding the powder into a resin at high concentration. Also, dispersion of the micropowder cannot fully be attained, even when the micropowder is used in combination with a silica powder formed of large particles.

When the method disclosed in Non-Patent Document 1 is employed, a large number of unhydrolyzed alkoxyl groups remain inside the formed silica particles, and alcohol is released from the silica particles via heating or hydrolysis. Thus, difficulty is encountered in formation of high-density silica particles, and the moisture resistance of the silica-containing resin composition and the cured resin product may be considerably reduced. In another case, after elimination of alkoxyl groups via hydrolysis, pores or silanol groups remain inside the silica particles, under certain conditions. In such a case, a basic catalyst, water, alcohol, etc. may remain through adsorption. Thus, the characteristics of the silica-containing resin composition and the cured resin product may be impaired by the basic catalyst or the like.

The method disclosed in Patent Document 1 has a step of hydrolyzing an alkoxysilane in an aqueous alcoholic solution. Therefore, similar to the method disclosed in Non-Patent Document 1, a large number of unhydrolyzed alkoxyl groups may remain inside the formed silica particles. Conceivably, difficulty is encountered in forming high-density silica particles, and the moisture resistance of the silica-containing resin composition may be drastically impaired. Also, the micropowder produced though the above method and having a particle size of some tens of nm or less tends to aggregate during the course of growth of the particles. Thus, problematically, difficulty is encountered in producing a silica sol in which spherical silica particles are dispersed at high dispersion degree.

The method disclosed in Patent Document 2 has a problem. Specifically, when sodium hydroxide is used as a hydrolysis catalyst, sodium ions remain inside the silica particles in the produced sol, even after conducting cation exchange. In the case where an amine or the like is used as a hydrolysis catalyst, coloring or performance impairment of the resin to which the silica sol has been added may occur due to possibly contained amine or the like in a large amount.

In view of the forgoing, an object of the present invention is to provide a silica-containing resin composition which contains high-purity silica at high concentration and whose moisture resistance and transparency are not drastically reduced. Another object is to provide a method for producing the silica-containing resin composition. Still another object is to provide a molded article of the silica-containing resin composition.

Means for Solving the Problems

In one mode of the present invention for solving the aforementioned problems, there is provided a silica-containing resin composition, characterized by comprising a resin and silica particles in an amount of 5 to 300 parts by mass, with respect to 100 parts by mass of the resin, wherein the silica particles satisfy the following requirements (a) to (c):

(a) the silica particles have a specific surface area, as determined through a nitrogen absorption method, of 20 to 500 $m^2/g$;

(b) the silica particles have a percent moisture absorption of 5.0 mass % or less at a relative humidity of 50%; and (c) the silica particles contain substantially no metallic impurity or halogen.

Preferably, the silica particles are produced through hydrolysis of a silicon alkoxide and have a moisture absorption amount per surface area thereof of 0.5 $mg/m^2$.

Also preferably, the silica particles are surface-treated silica particles which have undergone organophilization with an organic silane compound at ≥0.5 molecules per 1 $nm^2$ surface thereof.

The organic silane compound is preferably at least one compound selected from the group consisting of alkoxysilane, silazane, siloxane, acetoxysilane, and silylurea.

Preferably, the surface-modified silica particles have a percent moisture absorption of 3.0 mass % or less at a relative humidity of 50%.

In another mode of the present invention to solve the aforementioned problems, there is provided a molded article formed of any one of the silica-containing resin compositions.

In another mode of the present invention to solve the aforementioned problems, there is provided a method for producing a silica-containing resin composition, characterized in that the method comprises:

forming silica particles having a moisture absorption amount per surface area thereof of 0.5 $mg/m^2$ or less through the following steps (A) and (B); and incorporating the silica particles in an amount of 5 to 300 parts by mass, with respect to 100 parts by mass of a resin, wherein:

step (A) is a step of using at least one member selected from among ammonia, primary to tertiary amines, and a quaternary ammonium, as a hydrolysis catalyst; and step (B) is a step of hydrolyzing a silicon alkoxide in water and/or a hydrophilic organic solvent serving as a reaction medium in the presence of the hydrolysis catalyst.

In step (B), the temperature of the reaction medium is adjusted to 60° C. or higher, and the ratio by mole of water to silicon ($H_2O/Si$) is maintained at 25 or higher.

Preferably, the method further includes step (C) of modifying the silica particles with an organic silane compound at molecules per 1 $nm^2$ surface of the silica particles.

Effects of the Invention

The present invention enables provision of a silica-containing resin composition which contains high-purity silica at high concentration and whose moisture resistance and transparency are not drastically reduced.

The present invention also enables provision of a method for producing a silica-containing resin composition which contains high-purity silica at high concentration and whose moisture resistance and transparency are not drastically reduced, as well as a molded article formed from the silica-containing resin composition.

MODES FOR CARRYING OUT THE INVENTION

The silica-containing resin composition of an embodiment comprises a resin and silica particles in an amount of 5 to 300 parts by mass, with respect to 100 parts by mass of the resin, wherein the silica particles satisfy the following requirements (a) to (c):

(a) the silica particles have a specific surface area, as determined through a nitrogen absorption method, of 20 to 500 $m^2/g$;

(b) the silica particles have a percent moisture absorption of 5.0 mass % or less at a relative humidity of 50%; and (c) the silica particles contain substantially no metallic impurity or halogen.

Hereinafter, the silica-containing resin composition of this embodiment will be described in detail.

Firstly, regarding requirement (a), the silica particles have a specific surface area, as determined through a nitrogen absorption method, of 20 to 500 $m^2/g$, preferably 30 to 300 $m^2/g$. When the specific surface area is less than the lower limit of the range, characteristics of nano particles cannot be fully attained, whereby effects of improving properties such as surface hardness, heat resistance, and insulating property, of the resin into which silica is incorporated cannot fully be attained. In addition, the transparency of the silica-containing resin composition and the molded article (cured resin product) may be impaired due to light scattering. When the specific surface area is greater than the upper limit of the range, an increased amount of an organic silane compound must be used for surface treatment, thereby readily impairing silica filling density.

As used herein, the "specific surface area, as determined through a nitrogen absorption method" in requirement (a) refers to a surface area of silica particles per unit weight thereof. As described in the Examples below, the specific surface area can be calculated through an experiment employing, for example, a dry powder of silica particles.

Regarding requirement (b), the silica particles have a percent moisture absorption of 5.0 mass % or less at a relative humidity of 50%, preferably 3.0 mass % or less. When the percent moisture absorption is greater than the upper limit of the above range, the moisture resistance of the silica-resin composition may drastically decrease.

In the present invention, as described in the Examples below, the amount of moisture absorption may be calculated through an experiment employing, for example, a dry powder of silica particles.

Regarding requirement (c), the silica particles contain substantially no metallic impurity or a halogen element impurity such as chlorine (Cl). The requirement is equivalent to the silica particles not being produced by use of a raw material, a catalyst, water, a solvent, and other materials, containing a metallic impurity and chlorine (Cl) or the like. In other words, the silica particles are produced through a method which does not allow a metallic impurity or chlorine or the like to be included.

Specifically, when the silica particles are obtained through a method in which a metal-containing compound such as sodium hydroxide is used as a catalyst or a method employing a chlorine-containing compound such as silicon tetrachloride ($SiCl_4$) as a raw material, a metallic impurity or a chlorine compound or chlorine in ion form, originating from the catalyst or the raw material, may remain in the silica particles. In another possible case, these impurities including a metallic impurity may remain on the outside of the silica particles. Thus, when the silica particles contain a metallic impurity or chlorine, a high-purity, silica-containing resin composition fails to be produced, and the cured resin product of the resin composition fails to have high purity.

In contrast, in this embodiment, the silica particles contain substantially no metallic impurity or halogen, as stipulated by requirement (c). By virtue of this feature, a high-purity, silica-containing composition and cured resin product can be produced, and the silica particles can find specific suitable uses where high purity is required; e.g., electronic material uses.

As used herein, the metallic impurity refers to a metal which may reduce the purity of silica particles. Examples of the metallic impurity include Li, Na, K, Mg, Ti, Fe, Cu, Ni, Cr, and Al. The metallic impurity is not limited to an impurity contained in a raw material, a catalyst, water, a solvent, and other materials, and includes an impurity which might enter the silica particles during production of the silica particles and which can be deposited on the surfaces of the silica particles after production thereof.

As used herein, the "halogen" refers to a species that may reduce the purity of silica particles. Examples thereof include fluorine ion, fluoride, chlorine ion, chloride, bromine ion, and bromide. These halogen elements are not limited to those contained in a raw material, a catalyst, water, a solvent, and other materials and may include a halogen species which might enter the silica particles during production of the silica particles and which can be deposited on the surfaces of the silica particles after production thereof.

In the present specification, requirement (c) that "the silica particles contain substantially no metallic impurity or halogen" means silica particles having a metallic impurity content or a chlorine content of 1 µmol/g or lower, preferably 0.5 µmol/g or lower. As shown in the below-mentioned Examples, the metallic impurity content and the chlorine content may be calculated through an experiment employing, for example, a silica sol or a dry powder of silica particles.

The silica particles satisfying the aforementioned requirements (a) to (c) may be produce by hydrolyzing a specific silicon alkoxide in the presence of a hydrolysis catalyst such as ammonia under specific conditions, to thereby provide silica particles having a moisture absorption amount per surface area thereof of 0.5 mg/m², and subjecting the particles to surface treatment.

More specifically, in hydrolysis of a specific silicon alkoxide, the generated active silicic acid is polymerized under control, in the presence of a hydrolysis catalyst such as ammonia under specific conditions including the hydrolysis catalyst concentration, the water concentration, and the reaction temperature, to thereby yield silica particles having excellent dispersibility, the particles having a specific surface area of 20 to 500 m²/g, as determined by a nitrogen absorption method (requirement (a)). Also, under the above specific conditions, polymerization of active silicic acid is promoted, whereby high-density silica particles having a moisture absorption amount per surface area thereof of 0.5 mg/m² or less can be obtained. Since the percent moisture absorption varies depending on the amount of water absorbed on the particle surface, it might be a large value, when the specific surface area of the particles is large even in the case of high-density particles. However, if the particles themselves have high density, moisture absorption of the surface can be suppressed. As a result, silica particles having a percent moisture absorption of 5.0 mass % or less can be obtained (requirement (b)).

Through use of a specific silicon alkoxide as a raw material and a hydrolysis catalyst such as ammonia, inclusion of a metallic impurity and chlorine originating from the raw material or the catalyst into silica particles can be prevented. Thus, unless a metallic impurity and chlorine intermingles in another step, silica particles containing substantially no metallic compound or chlorine can be obtained (requirement (c)).

Thus, in this embodiment, in the presence of a hydrolysis catalyst such as ammonia, a specific silicon alkoxide is hydrolyzed under controlled conditions including the hydrolysis catalyst concentration of the reaction medium and reaction temperature, whereby silica particles satisfying the aforementioned requirements (a) to (c) can be obtained.

Instead of the hydrolysis technique of this embodiment for producing silica particles, when a different technique such as a vapor phase technique or a firing technique is employed for producing silica particles, chlorine may remain in silica particles, the chlorine originating from an employed chlorine-containing compound such as silicon tetrachloride. In such a case, silica particles satisfying the aforementioned requirements cannot be formed. Also, the silica micropowder formed through pyrolysis of silicon tetrachloride is formed of aggregated silica particles, and difficulty is encountered in addition of such a silica micropowder to a resin at high concentration. Even when the micropowder is used in combination with a silica powder formed of large particles, dispersion of the micropowder cannot be improved.

In this embodiment, the aforementioned silicon alkoxide is preferably an alkyl ester of silicic acid monomer or a silicic acid oligomer having a polymerization degree of 2 to 3 and having a C1 or C2 alkyl group. Examples of preferred silicon alkoxides include tetramethyl silicate, tetraethyl silicate, methyl triethyl silicate, dimethyl diethyl silicate, trimethyl ethyl silicate, and a trialkyl silicate having a C1 or C2 alkyl group. Notably, a mixed ester having different alkyl groups in the molecule thereof, or a mixture of such mixed esters may also be used. Thus, when tetraethyl silicate is used as the silicon alkoxide, a mixed ester having different alkyl groups in the molecule thereof may be additionally present.

In this embodiment, the hydrolysis catalyst is preferably ammonia, a water-soluble amine, or a quaternary ammonium hydroxide. By use of such a hydrolysis catalyst, active silicic acid generated in hydrolysis can be rapidly polymerized, whereby high-density silica particles with low moisture absorption can be formed. Thus, a considerable drop in moisture resistance of a silica-containing resin composition or a cured resin product can be prevented.

Particularly preferably, the hydrolysis catalyst is ammonia or a water-soluble amine, having a boiling point of 100° C. or lower, with ammonia being more preferred. Since the hydrolysis catalyst is formed of a relatively small molecule, it can readily be removed through distillation or the like. Thus, the produced silica-containing resin composition or cured resin product is readily provided with higher purity.

Notably, as the aforementioned water soluble-amine, a low-boiling-point alkylamine such as monoalkylamine, dialkylamine, or trialkylamine may be used. Examples of the alkylamine include methylamine, dimethylamine, trimethylamine, ethylamine, diethylamine, triethylamine, propylamine, dipropylamine, and tripropylamine. Of these, methylamine and ethylamine, having low boiling point, are preferred.

The silica-containing resin composition of this embodiment contains silica particles satisfying the aforementioned requirements (a) to (c) in an amount of 5 to 300 parts by mass, with respect to 100 parts by mass of a resin, preferably 10 to 230 parts by mass. When the silica particle content is smaller than the lower limit of the range, difficulty is encountered in providing the resin composition with improved properties such as shrinkage after curing, thermal expansion property, heat resistance, insulation performance, and filler dispersion performance. When the silica particle content is greater than the upper limit of the range, resin properties are readily impaired.

The resin used in the invention may be appropriately selected, in accordance with characteristics and uses thereof, from resins having, for example, high purity and high transparency. Examples of such resins include thermoplastic resin, thermosetting resin, photo-curable resin, and electron beam-curable resin. Specific examples include polyethylene, polypropylene, polystyrene, AS resin, ABS resin, polycarbonate, polyamide, epoxy resin, acrylic resin, methacrylic resin, urethane resin, polyester resin, and fluororesin. These resins may be used singly or in combination of two or more species.

Examples of the epoxy resin include aromatic epoxy resins and alicyclic epoxy resins. Specific examples include bisphenol A-type epoxy resin, hydrogenated bisphenol A-type epoxy resin, bisphenol F-type epoxy resin, brominated bisphenol A-type epoxy resin, bisphenol S-type epoxy resin, biphenyl-type epoxy resin, naphthalene-type epoxy resin, phenol novolak epoxy resin, o-cresol novolak epoxy resin, and triglycidyl isocyanurate epoxy resin.

Examples of the acrylic resin and methacrylic resin include poly(methyl methacrylate) resin. Specific examples include those produced by polymerizing one or two or more members of (meth)acrylic monomers such as trifluoroethyl acrylate, trifluoromethyl acrylate, phenylglycidyl acrylate, hydroxyethyl(meth)acrylate, tetrahydrofuryl acrylate, acryloylmorpholine, neopentyl glycol(meth)acrylate, 1,6-hexanediol di(meth)acrylate, trimethylolpropane(meth)acrylate, di(trimethylolpropane) tetra(meth)acrylate, pentaerythritol tetra(meth)acrylate, and pentaerythritol tri(meth)acrylate.

Examples of the polyester resin include polyesters formed from a dicarboxylic acid and a glycol. Examples of the dicarboxylic acid include terephthalic acid, isophthalic acid, phthalic acid, 2,6-naphthalenedicarboxylic acid, 4,4-diphenyldicarboxylic acid, 1,4-cyclohexanedicarboxylic acid, adipic acid, sebacic acid, phenylindandicarboxylic acid, and dimer acid. Examples of the glycol include ethylene glycol, 1,4-butanediol, neopentyl glycol, diethylene glycol, dipropylene glycol, 1,6-hexanediol, 1,4-cyclohexanedimethanol, xylylene glycol, dimethylolpropionic acid, glycerin, trimethylolpropane, poly(ethyleneoxy) glycol, and poly(tetramethyleneoxy) glycol.

Examples of the urethane resin include urethane resins formed through polyaddition of a polyisocyanate and an active hydrogen-containing compound. Examples of the polyisocyanate include ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, (2,6-diisocyanatomethyl caproate), bis(2-isocyanatoethyl)fumarate, bis(2-isocyanatoethyl) carbonate, 2-isocyanatoethyl-2,6-diisocyanatohexanoate, and isophorone diisocyanate (IPDI). Examples of the active hydrogen-containing compound include a dihydric alcohol, a branched diol, a diol having a cyclic group, a divalent phenol, and a polyhydric alcohol.

However, no particular limitation is imposed on the resin which may be employed in this embodiment, so long as the gist of the present invention is not changed. Examples of such resins include phenolic resin, urea resin, melamine resin, organosilicon resin, and polyvinyl alcohol resin.

According to the silica-containing resin composition of this embodiment, in the case where the moisture resistance of the silica particles satisfying the requirements (a) to (c) is higher than that of the resin of the composition, the moisture resistance of the resin composition can be enhanced, as compared with a silica-containing resin composition produced by incorporating an equiamount of conventional silica particles thereinto. In addition, through increasing the silica particle content of the silica-containing resin composition, the moisture resistance can be further enhanced.

On the other hand, even when the moisture resistance of the resin of the composition is higher than that of the silica particles satisfying the requirements (a) to (c), according to the silica-containing resin composition of this embodiment, a considerable drop in moisture resistance of the resin composition can be more effectively prevented, as compared with a silica-containing resin composition produced by incorporating an equiamount of conventional silica particles thereinto. These advantages can be realized, since the silica particles satisfying the requirements (a) to (c) have higher density and more excellent moisture absorption resistance, as compared with conventional silica particles. In addition, through reducing the silica particle content of the silica-containing resin composition, a drop in moisture resistance can be further prevented.

The silica particles contained in the silica-containing resin composition are preferably surface-treated silica particles which have undergone organophilization with an organic silane compound at ≥0.5 molecules (preferably 1.0 molecule) per 1 $nm^2$ surface thereof. Through surface treatment, aggregation of silica particles is inhibited, to thereby enhance dispersibility of the silica particles in the resin. Furthermore, through surface modification of the silica particles, a drop in moisture resistance can be further prevented, whereby a silica-containing resin composition and a cured resin product which have high purity and high transparency can be produced.

The organic silane compound is a compound having a carbon atom bonded to silicon, and examples of the compound which may be employed in the invention include alkoxysilane, silazane, siloxane, acetoxysilane, and silylurea. Specific examples of the organic silane compound include methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, n-butyltriethoxysilane, isobutyltrimethoxysilane, tert-butyltrimethoxysilane, tert-butyltriethoxysilane, n-hexyltrimethoxysilane, n-hexyltriethoxysilane, n-octyltrimethoxysilane, n-octyltriethoxysilane, isooctyltrimethoxysilane, isooctyltriethoxysilane, n-dodecyltrimethoxysilane, n-dodecyltriethoxysilane, hexadecyltrimethoxysilane, n-octadecyltrimethoxysilane, n-octadecyltriethoxysilane, cyclohexyltrimethoxysilane, cyclohexyltriethoxysilane, benzyltrimethoxysilane, benzyltriethoxysilane, phenyltrimethoxysilane, phenyltriethoxysilane, 4-butylphenyltrimethoxysilane, 4-butylphenyltriethoxysilane, 3,3,3-trifluoropropyltrimethoxysilane, 3,3,3- trifuloropropyltriethoxysilane, nonafluorohexyltrimethoxysilane, nonafluorohexyltriethoxysilane, vinyltrimethoxysilane, vinyltriethoxysilane, allyltrimethoxysilane, allyltriethoxysilane, butenyltrimethoxysilane, butenyltriethoxysilane, ethynyltrimethoxysilane, ethynyltriethoxysilane, propagyltrimethoxysilane, propagyltriethoxysilane, dimethyldimethoxysilane, dimethyldiethoxysilane, diisopropyldimethoxysilane, dibutyldimethoxysilane, dibutyldiethoxysilane, dihexyldimethoxysilane, dihexyldiethoxysilane, didodecyldimethoxysilane, didodecyldiethoxysilane, methyloctyldimethoxysilane, methyloctyldiethoxysilane, dodecylmethyldimethoxysilane, methyloctyldiethoxysilane, diphenyldimethoxysilane, diphenyldiethoxysilane, n-butylmethyldimethoxysilane, phenylmethyldimethoxysilane, cyclohexylmethyldimethoxysilane, cyclohexylethyldimethoxysilane, trimethylmethoxysilane, triethylmethoxysilane, triethylethoxysilane, tripropylmethoxysilane, tripropylethoxysilane, triphenylmethoxysilane, triphenylethoxysilane, diphenylmethylmethoxysilane, diphenylmethylethoxysilane, methylhydrodimethoxysilane, ethyltriacetoxysilane, chloropropyltrimethoxysilane, chloropropylmethyldimethoxysilane, chloroisobutylmethyldimethoxysilane, trifuloropropylmethyldimethoxysilane, triphenylsilanol, dicyclopentyldimethoxysilane, tert-butylethyldimethoxysilane, tert-butylpropyldimethoxysilane, dicyclohexyldimethoxysilane, mercaptopropyltrimethoxysilane, mercaptopropylmethyldimethoxysilane, bis(triethoxysilylpropyl) disulfide, bis(triethoxysilylpropyl) tetrasulfide, aminopropyltrimethoxysilane, m-aminophenyltrimethoxysilane, aminopropylmethyldiethoxysilane, phenylaminopropyltrimethoxysilane, aminoethylaminopropyltrimethoxysilane, aminoethylaminopropylmethyldimethoxysilane, glycidoxypropyltrimethoxysilane, glycidoxypropylmethyldimethoxysilane, epoxycyclohexylethyltrimethoxysilane, γ-methacryloyloxypropyltriacetoxysilane, vinyltriacetoxysilane, vinyltrimethoxysilane, methylvinyldimethoxysilane, vinyldimethylmethoxysilane, divinyldimethoxysilane, vinyltris(2-methoxyethoxy)silane, hexenyltrimethoxysilane, γ-methacryloxypropyltrimethoxysilane, acryloxypropyltrimethoxysilane, vinylbenzylethylenediaminopropyltrimethoxysilane, allylethylenediaminepropyltrimethoxysilane, allyltrimethoxysilane, allylmethyldimethoxysilane, allyldimethylmethoxysilane, hexenyltrimethoxysilane, and hexamethyldisilazane. However, no particular limitation is imposed on the organic silane compound, so long as it has an organic moiety directly bonded to silicon and can serve as a surface-treatment agent for organophilizing the surfaces of silica particles. These organic silane compounds may be used singly or in combination of two or more species.

Notably, among organic silane compounds, a compound having two or more organic moieties in one molecule thereof; e.g., disilane, may be used. In this case, no limitation is imposed on the number of the organic moieties in the molecule, and the number of modifying molecules is important. Thus, such an organic silane compound may be used, so long as the organic silane compound can modify the surfaces of silica particles at ≥0.5 molecules per 1 nm² surface of the particles.

The above-described silica-containing resin composition can be formed into, in accordance with characteristics and uses thereof, various cured resin products (e.g., transparent plastic sheet, plastic lens, and plastic bottle) through thermal curing, photo-curing, electron beam-curing, curing with a curing agent, or other curing means. Particularly, in the embodiment, incorporation of silica particles can improve properties such as shrinkage after curing, thermal expansion property, heat resistance, and insulation performance. Thus, a considerable drop in moisture resistance can be prevented, to thereby yield a cured product of the silica-containing resin composition with high purity and high transparency.

Next, an embodiment of the method for producing the silica-containing resin composition will be described in detail. The method of this embodiment for producing a silica-containing resin composition includes:

forming silica particles having a moisture absorption amount per surface area thereof of 0.5 mg/m² or less through the following steps (A) and (B); and incorporating the silica particles in an amount of 5 to 300 parts by mass, with respect to 100 parts by mass of a resin, wherein:

step (A) is a step of using at least one member selected from among ammonia, primary to tertiary amines, and a quaternary ammonium, as a hydrolysis catalyst; and step (B) is a step of hydrolyzing a silicon alkoxide in water and/or a hydrophilic organic solvent serving as a reaction medium in the presence of the hydrolysis catalyst.

Firstly, regarding in step (A), at least one member selected from among ammonia, primary to tertiary amines, and a quaternary ammonium is used as a hydrolysis catalyst. Use of such a catalyst may prevent adverse effects on purity of silica, which would otherwise be caused by a remaining hydrolysis catalyst. When ammonia or a low-boiling-point amine is used as a hydrolysis catalyst, it can readily be removed through distillation or the like.

In step (B), silicon alkoxide is hydrolyzed in water and/or a hydrophilic organic solvent serving as a reaction medium in the presence of a hydrolysis catalyst. Through this procedure, the added silicon alkoxide can be suitably hydrolyzed, and the number of unreacted alkoxy groups remaining in the silica particles can be reduced. Therefore, there can be prevented impairment in moisture resistance and purity of the silica-containing resin composition and the cured resin product obtained from the resin composition.

In step (B), the water concentration of the reaction medium is preferably adjusted to 60 mass % or higher, more preferably 80 mass % or higher. Through this concentration adjustment, the added silicon alkoxide can be suitably hydrolyzed, and the number of unreacted alkoxy groups remaining in the silica particles can be readily reduced. Water employed in hydrolysis may be pure water or ultra-pure water such as ion-exchange water, ultrafiltrated water, reverse osmotic water, or distilled water. The water used herein may be appropriately chosen in accordance with characteristics and uses of the silica-containing resin composition. In the case of production of a high-purity silica-containing resin composition employable as electronic material, low-impurity water or ultra-pure water is particularly preferably used. However, the water is not particularly limited to the aforementioned examples of water species, so long as the gist of the present invention is not changed, and these water species may be used singly or in combination of two or more species. As used herein, the water concentration is a water concentration (mass %) of a reaction medium excluding the hydrolysis catalyst.

Since alcohol is generated through hydrolysis of silicon alkoxide, the water content of the reaction medium gradually decreases with the progress of hydrolysis. Thus, in order to maintain the water content of the reaction medium during feeding of silicon alkoxide, the amount of silicon alkoxide added to the reaction medium is preferably controlled in such a manner that the generated alcohol concentration of the reaction medium does not rise excessively. In another preferred mode, a part of the generated alcohol is discharged to the outside of the reaction system through distillation or another technique, before rise in alcohol concentration. As a result, continued presence of unreacted alkoxy groups inside the silica particles can be readily prevented.

Other than water, no particular limitation is imposed on the reaction medium, so long as the gist of the present invention is not changed, and the aforementioned hydrophilic organic solvent may be used. Examples of the hydrophilic organic solvent include methanol, ethanol, propanol, isopropanol, butanol, isobutanol, ethylene glycol, ethylene glycol monoalkyl ethers, propylene glycol, proylene glycol monoalkyl ethers, acetonitrile, dimethyl sulfoxide, dimethylformamide, dimethylacetamide, acetone, tetrahydrofuran, and diethylene glycol. These hydrophilic organic solvents may be used singly or in combination of two or more species.

Notably, when the same solvent as an alcohol generated by hydrolysis of an silicon alkoxide is employed as a hydrophilic organic solvent, recovery and re-use of the alcohol in the reaction medium are facilitated. When tetramethyl silicate is used as the silicon alkoxide, methanol may be used as the hydrophilic organic solvent, whereas when tetraethyl silicate is used as the silicon alkoxide, ethanol may be used as the hydrophilic organic solvent.

In step (B), preferably, the water concentration of the reaction medium with respect to the total amount of added silicon ($H_2O/Si$) is adjusted to 25 or higher, and the temperature of the reaction medium is adjusted to 60° C. or higher. Through the control, polymerization of active silicic acid generated through hydrolysis of silicon alkoxide can be promoted, to thereby yield high-density silica particles having excellent moisture absorption resistance.

In step (B), the ratio by mole of the hydrolysis catalyst to the entirety of the silicon alkoxide added (hydrolysis catalyst/Si) is preferably adjusted to 0.01 to 1.0, more preferably to 0.02 to 0.6. Through this control, a sufficient amount of hydrolysis catalyst with respect to the silicon alkoxide can be caused to be present in the reaction medium, whereby active silicic acid generated via hydrolysis can be rapidly bonded to the particles present in the reaction system. Thus, high-density silica particles having excellent moisture absorption resistance can be obtained. No particular limitation is imposed on the method of adjusting the mole ratio (hydrolysis catalyst/Si) to fall within the above range. In one method, addition of silicon alkoxide is appropriately halted, and a hydrolysis catalyst is added to the reaction medium, to thereby elevate the hydrolysis catalyst concentration.

In order to cause the mole ratio (hydrolysis catalyst/Si) to fall within the above range, the initial hydrolysis catalyst concentration of the reaction medium is preferably adjusted to fall within a specific range. Specifically, the initial hydrolysis catalyst concentration is preferably adjusted to 0.005 to 1.0 mol/L-reaction medium. Through this control, there can be prevented a drop in polymerization rate of active silicic acid generated via hydrolysis of silicon alkoxide, along with difficulty in controlling hydrolysis reaction rate.

In step (B), preferably, silicon alkoxide is continuously or intermittently added to the reaction medium. For example, silicon alkoxide is preferably added at 2 mol/L-reaction medium/hour or less, more preferably 1 mol/L-reaction medium/hour or less. Through this control, the silica aggregation rate can be smaller than the silicon alkoxide hydrolysis rate, whereby continued presence of alkoxy groups inside the silica particles is prevented, and silica particles having excellent moisture resistance can be readily obtained.

These silicon alkoxides may be added as a non-diluted form or a dilute form with a solvent that can mutually dissolve alkoxide and water. The dilution solvent promotes mutual dissolution of water and silicon alkoxide so as to promote reaction, and controls the reaction by the effect of dilution of alkoxide. Examples of the dilution solvent include methanol, ethanol, propanol, isopropanol, butanol, isobutanol, ethylene glycol, ethylene glycol monoalkyl ethers, propylene glycol, propylene glycol monoalkyl ethers, acetonitrile, dimethyl sulfoxide, dimethylformamide, dimethylacetamide, acetone, tetrahydrofuran, and diethylene glycol. Even in the case where such a dilution solvent is used, the water content of the reaction solvent must be maintained at 60 mass % or higher.

When a silicon alkoxide is added to the reaction medium, the silicon alkoxide is hydrolyzed by the action of the hydrolysis catalyst, and eventually, cores of silica are formed in the reaction medium. In this embodiment, when the initial hydrolysis catalyst or water concentration is controlled to fall within, for example, the aforementioned range, sufficient amounts of water and the hydrolysis catalyst with respect to the added silicon alkoxide can be constantly present in the reaction medium. Thus, the added silicon alkoxide polymerizes around the cores formed in the reaction medium, causing growth of silica nuclei.

As a result, even when tetramethyl silicate, which has high reactivity and whose reaction is difficult to control, is used as a silicon alkoxide, there can be obtained silica particles which have, for example, a specific surface area, as determined by a nitrogen absorption method, of 20 to 500 $m^2/g$, and a moisture absorption amount per surface area thereof of 0.5 $mg/m^2$ or less, and which contain substantially no metallic compound or chlorine. The silica particles formed under the conditions are spherical particles and have high dispersibility, thereby serving as an additive suitable for adding to a resin at high concentration. In the case of water-dispersed sol, such spherical silica particles having excellent dispersibility preferably have a ratio (D2/D1) of mean particle size (D2) measured through dynamic light scattering to mean particle size (D1) measured through the BET method of 2.0 or lower, more preferably 1.6 or lower. In the sol having a ratio (D2/D1) higher than the above value, silica particles are bonded together in the dispersion medium to provide a non-spherical form, to thereby realize a wide particle size distribution profile. Thus, controlling the ratio (D2/D1) to be lower than the value realizes a suitable mode for addition to resin, at high concentration, of a water-dispersed sol containing spherical silica particles having excellent dispersibility. However, when two or more sols containing spherical silica particles having different particle sizes particle size are used in combination, the aforementioned requirement is not necessarily satisfied.

The aforementioned silicon alkoxide may be added to the reaction system through dropwise adding thereof from the upper section of the reaction container to the liquid surface. Alternatively, the feed outlet may be brought into contact with the reaction medium, to thereby feed the alkoxide into the liquid. Through this procedure, gel formation and generation of coarse particles, which would otherwise occur in the vicinity of the feed outlet, can be suppressed. Particularly, tetramethyl silicate, exhibiting high hydrolysis rate, is preferably added directly to the liquid.

In addition of silicon alkoxide to the reaction medium, the active silicic acid formed during hydrolysis of silicon alkoxide polymerizes, to thereby uniformly deposit on the silica particles under stirring. Through stirring the reaction medium, contact between unsolved silicon alkoxide and the reaction medium is promoted, whereby dissolution of undissolved matter in the reaction medium is promoted, to thereby facilitate dissolution and hydrolysis.

Notably, before adding silicon alkoxide, silica particles serving as growth nuclei may also be added in advance to the reaction medium. Through the addition, silica particles having a large mean particle size can be readily produced, as compared with the case where growth nuclei are caused to spontaneously generate and grow in the reaction medium. No particular limitation is imposed on the technique of adding silica particles serving as the nuclei, and there may be employed the following procedure. Specifically, the reaction medium is maintained at 60° C. or lower at an initial stage of reaction, and a part of the silicon alkoxide is added, to thereby generate micronuclei through hydrolysis. Then, the reaction medium is maintained at 60° C. or higher, and the remaining silicon alkoxide is added, to thereby conduct growth of particles.

Since the reaction medium, which contains a hydrolysis catalyst even after production of silica particles, has a pH in an alkali range, the active silicic acid may be dissolved therein in some cases. Thus, the entirety or a part of the hydrolysis catalyst may be removed from the medium. Through this procedure, the pH of the reaction system decreases, whereby active silicic acid remaining in the reaction medium becomes to deposit on the surfaces of the silica particles. Thus, the amount of active silicic acid can be reduced, and adverse effects on stability and moisture absorption resistance of the silica sol can be prevented after concentration and, furthermore, those of the silica-containing resin composition and the cured resin product obtained from the silica sol can also be avoided.

In removal of the entirety or a part of hydrolysis catalyst, the temperature of the medium may be elevated to 80° C. or higher, preferably 90° C. or higher, after adjustment of the pH of the medium to 10 or lower. Through this adjustment, the silica particle surfaces could be further densified.

No particular limitation is imposed on the method of removing the hydrolysis catalyst, and examples of the method include distillation, ion exchange, and ultrafiltration. However, preferred is a method in which the medium is heated to evaporate ammonia at a temperature equal to or higher than the boiling temperature of the medium, to thereby evaporate out the hydrolysis catalyst. Through the method, the entirety or a part of the hydrolysis catalyst can be reliably removed. Particularly, through heating while gradually decreasing the amount of hydrolysis catalyst, active silicic acid remaining in the reaction medium tends to deposit on the surfaces of the silica particles, whereby the surfaces of the silica particles can be densified.

In the case where an organic solvent-dispersed sol is produced via substitution of the organic solvent, both water and the hydrolysis catalyst may be removed through distillation.

To the thus-obtained silica particles, an organic silica compound may be added such that the surfaces of the silica particles are modified with an organic silane compound at ≥0.5 molecules per 1 $nm^2$ surface thereof. No particular limitation is imposed on the modification method, and one exemplary method includes dispersing silica particles in water or an organic solvent, to form a silica particle dispersion in sol form, and adding the aforementioned organic silica compound. In a step of reacting silica particles with an organic silica compound, preferably, the pH of the dispersion is adjusted to 7 or higher by use of an organic base compound such as ammonia is used. Through this procedure, surface modification of the silica particles is suitably caused to proceed. Notably, no particular limitation is imposed on the organic solvent used herein, and such examples include alcohol, ether, ketone, ester, hydrocarbon, epoxides.

No particular limitation is imposed on the organic base compound for adjusting pH, and a preferably used one is a secondary amine or a tertiary amine, in consideration of effects on the silica-containing resin composition, in the case where the solvent or the like to be added to the resin component and be used in the addition step has reactivity to active hydrogen of the amine. Particularly, a tertiary amine is most preferred. Examples of such secondary and tertiary amines include amines such as an alkylamine, an allylamine, an aralkylamine, an alicyclic amine, an alkanolamine, and a cyclic amine. Specific examples include diethylamine, triethylamine, diisopropylamine, triisopropylamine, di-n-propylamine, tri-n-propylamine, diisobutylamine, di-n-butylamine, tri-n-butylamine, dipentylamine, tripentylamine, di-2-ethylhexylamine, di-n-octylamine, tri-n-octylamine, N-ethyldiisopropylamine, dicyclohexylamine, N,N-dimethylbutylamine, N,N-dimethylhexylamine, N,N-dimethyloctylamine, N,N-dimethylbenzylamine, piperidine, N-methylpiperidine, and quinuclidine; and alkaonlamines such as triethanolamine, N-methyldiethanolamine, N,N-dimethylethanolamine, N,N-diethylethanolamine, N,N-dibutylethanolamine, triisopropanolamine, imidazole, imidazole derivatives, 1,8-diazabicyclo(5,4,0)undec-7-ene, 1,5-diazabicyclo(4,3,0)non-5-ene, 1,4-diazabicyclo(2,2,2)octane, and diallyamine. These organic bases may be used singly or in combination of two or more species.

However, no particular limitation is imposed on the organic base compound for adjusting the pH, so long as the gist of the present invention is not changed, and ammonia or a primary amine may be used. In such a case, the entirety or a part of ammonia and primary amine is preferably removed through drying, distillation, or a similar technique, before mixing the formed silica particles with the resin. Through the procedure, impairment on stability and color of the silica-containing resin composition can be prevented.

In the case where the dispersion medium contains a specific organic solvent, the organic solvent is preferably removed after surface modification of silica particles, through drying, solvent substitution, or a similar step. Through the treatment, there can be prevented impairment on the silica-containing resin composition or the cured resin product, which would otherwise be caused due to inclusion of a specific organic solvent into the resin composition.

No particular limitation is imposed on the method of incorporating the thus-obtained silica particles or surface-modified silica particles into resin, so long as the gist of the present invention is not changed. In one specific procedure, a powder or a dispersion of such particles may be incorporated into a precursor, which is a resin in the form liquid at 0 to 30° C. If needed, a dispersion aid, a surfactant, a coupling agent, or the like for enhancing dispersibilty of silica particles may be further added thereto. No particular limitation is imposed on the method of curing the resin precursor, and thermal curing, photo-curing, electron beam-curing, curing with a curing agent, or other curing means may be appropriately selected, in accordance with characteristics and uses thereof. In an alternatively addition technique, the silica powder obtained by drying the surface-treating silica sol is kneaded with a thermoplastic resin.

EXAMPLES

The present invention will next be described in detail by way of example, which should not be construed as limiting the invention thereto.

<Production of Silica Sol>

[Production Example 1] Silica Sol [1]

To a 3-L stainless steel reactor equipped with a stirrer and a condenser, pure water (2,237 g) and 28-mass % aqueous ammonia (2.5 g) were added, and the contents of the reactor were maintained at 90° C. by means of an oil bath. Subsequently, a commercial product of tetraethyl silicate (TEOS) (261 g) was added dropwise to the reactor over 2.4 hours continuously under stirring. The water concentration of the reaction medium was maintained at 90 mass % or higher, and the ratio by mole of water to the total amount of added silicon ($H_2O/Si$) was maintained at 97 or higher.

After completion of feeding, the reaction was continuously stirred for a further 2 hours, while the temperature of the contents of the reactor was maintained at 90° C. Subsequently, the entirety of the liquid in the reactor was removed from the reactor, to thereby yield silica particles. The product was concentrated to 370 g under a reduced pressure of 26.7 to 10.7 kPa by means of a rotary evaporator, to thereby yield a silica sol having an $SiO_2$ content of 20.2 mass %, a pH of 7.0, a viscosity, as determined by means of a B-type viscometer at 25° C. (hereinafter referred to as "B-type viscosity"), of 4.5 mPa·s, and a dynamic light scattering particle size of 40 nm.

[Production Example 2] Silica Sol [2]

To the same reactor as employed in Production Example 1, pure water (2,240 g) and 28-mass % aqueous ammonia (6.7 g) were added, and the contents of the reactor were maintained at 80° C. by means of an oil bath. Subsequently, a commercial product of tetramethyl silicate (TMOS) (253 g) was added dropwise to the reactor over 3 hours continuously under stirring. The water concentration of the reaction medium was maintained at 91 mass % or higher, and the ratio by mole ($H_2O/Si$) was maintained at 72 or higher.

After completion of feeding, the temperature of the contents of the reactor was maintained at 80° C. for one hour and then elevated to 90° C. The reaction was continuously stirred at 90° C. for one hour. Subsequently, the liquid in the reactor was evaporated to the outside, to thereby concentrate the contents to a liquid temperature of 99° C. Then, the entirety of the contents was recovered from the reactor, to thereby recover silica particles. The product was concentrated to 400 g by means of a rotary evaporator under a reduced pressure of 13.3 kPa, to thereby yield silica sol [2] having an $SiO_2$ content of 25.0 mass %, a pH of 7.3, a B-type viscosity of 5.0 mPa·s, and a dynamic light scattering particle size of 17 nm.

[Production Example 3] Silica Sol [3]

To the same reactor as employed in Production Example 1, pure water (2,135 g), silica sol produced in Production Example 2 (42 g), and 28-mass % aqueous ammonia (27 g) were added, and the contents of the reactor were maintained at 80° C. by means of an oil bath. Subsequently, a commercial product of tetramethyl silicate (TMOS) (253 g) was added dropwise to the reactor over 5 hours continuously under stirring. The water concentration of the reaction medium was maintained at 90 mass or higher, and the ratio by mole ($H_2O/Si$) was maintained at 71 or higher.

After completion of feeding, the temperature of the contents of the reactor was maintained at 80° C. for one hour and then elevated to 90° C. The reaction was continuously stirred at 90° C. for one hour. Subsequently, similar to Production Example 1, the liquid in the reactor was evaporated to the outside, to thereby concentrate the contents to a liquid temperature of 99° C. Then, the entirety of the contents was recovered from the reactor, to thereby recover silica particles. The product was concentrated to 442 g by means of a rotary evaporator under a reduced pressure of 13.3 kPa, to thereby yield silica sol [3] having an $SiO_2$ content of 25.0 mass %, a pH of 7.8, a B-type viscosity of 7.4 mPa·s, and a dynamic light scattering particle size of 42 nm.

[Production Example 4] Silica Sol [4]

To the same reactor as employed in Production Example 1, pure water (2,235 g) and 25-mass % aqueous tetramethylammonium hydroxide (12 g) were added, and the contents of the reactor were maintained at 80° C. by means of an oil bath. Subsequently, a commercial product of tetramethyl silicate (TMOS) (253 g) was added dropwise to the reactor over 3 hours continuously under stirring.

After completion of feeding, the temperature of the contents of the reactor was maintained at 80° C. for one hour and then elevated to 90° C., at which stirring was continued. The reaction was cooled, to thereby recover a dispersion of grown particle. Then, to the same reactor as employed in Production Example 1, pure water (1,680 g), the dispersion of grown particle (380 g), and 25-mass % aqueous tetramethylammonium hydroxide (TMAH) (15 g) were added, and the contents of the reactor were maintained at 80° C. by means of an oil bath. Subsequently, a commercial product of tetramethyl silicate (TMOS) (425 g) was added dropwise to the reactor over 3 hours continuously under stirring. The water concentration of the reaction medium was maintained at 84 mass % or higher, and the ratio by mole ($H_2O/Si$) was maintained at 38 or higher.

After completion of feeding, the temperature of the contents of the reactor was maintained at 80° C. for one hour and then the liquid in the reactor was evaporated to the outside, to thereby concentrate the contents to a liquid temperature of 99° C. Then, the entirety of the contents was recovered from the reactor, to thereby recover silica particles. The product was concentrated to 873 g by means of a rotary evaporator under a reduced pressure of 13.3 kPa, to thereby yield silica sol [4] having an $SiO_2$ content of 21.0 mass %, a pH of 7.0, a B-type viscosity of 6.0 mP·s, and a dynamic light scattering particle size of 44 nm.

[Production Example 5] Silica Sol [5]

To the same reactor as employed in Production Example 1, pure water (2,237 g) and 28-mass % aqueous ammonia (2.5 g) were added, and the contents of the reactor were maintained at 85° C. by means of an oil bath. Subsequently, a commercial product of tetraethyl silicate (TEOS) (261 g) was added dropwise to the reactor over 2 hours continuously under stirring. The water concentration of the reaction medium was maintained at 90 mass or higher, and the ratio by mole ($H_2O/Si$) was maintained at 97 or higher.

After completion of feeding, the temperature of the contents of the reactor was elevated to 90° C., and the reaction was continuously stirred at 90° C. for 2 hours. Then, the entirety of the contents was recovered from the reactor, to thereby recover silica particles. The product was concentrated to 285 g by means of a rotary evaporator under a reduced pressure of 26.7 to 10.7 kPa, to thereby yield silica sol [5] having an $SiO_2$ content of 26.0 mass %, a pH of 6.8, a B-type viscosity of 6.3 mPa·s, and a dynamic light scattering particle size of 29.5 nm.

<Evaluation of Characteristics of Silica Sol Dry Powder>

[Measurement of Specific Surface Area]

The specific surface area of each of the silica sols of Production Examples 1 to 5 was determined through a nitrogen absorption method in the following manner. Specifically, the silica gel produced by drying the silica sol at 80° C. in a vacuum drier was pulverized with a mortar and further dried at 180° C. for 3 hours, to thereby yield dry silica powder. The specific surface area S ($m^2/g$) of the powder was determined through a nitrogen absorption method. From the specific surface area S, the mean particle size (D1) of each of the aqueous silica sol was calculated by the following formula.

[F1] $D1\ (nm) = 2,720/S$           (1)

Also, the particle size (D2) of the silica sol measured through dynamic light scattering was derived, and D2/D1 was calculated. Notably, the dynamic light scattering particle size (D2) was determined through a measurement procedure in which a silica sol was placed in a sealable container and stored therein at 50° C. for two weeks, and then diluted with 0.01-mass % aqueous ammonia.

The commercial product of silica particles [6] and that of silica sol [7] were subjected to measurement of specific surface area, and the D2/D1 of silica sol [7] was calculated. Table 1 shows the results.

[Moisture Absorption Property]

The percent moisture absorption of each of the silica sols of Production Examples 1 to 5 was determined in the following manner. Specifically, the same 180° C.-dried powder (0.2 to 0.3 g) as employed in specific surface area determination was placed in a weighing bottle, and the weight of the sample was determined. While the cap of the bottle was opened, the bottle was allowed to stand in an atmosphere (23° C., 50% RH) for 48 hours. Then, the bottle was closed by the cap, and the weight of the bottle was measured again. Percent moisture absorption was determined by the following formula [2]. The moisture absorption amount per specific surface area was determined based on the specific surface area (via nitrogen adsorption method) by the following formula [3]. The percent moisture absorption and the moisture absorption amount per specific surface area of the commercial product of silica particles [6] and that of silica sol [7] were also determined. Table 1 shows the results.

[F2] Percent moisture absorption (mass %)=(weight increase (g)/sample amount (g))×100     (2)

[F3] Moisture absorption amount per surface area ($mg/m^2$)=weight increase (mg)/(sample amount (g)×specific surface area ($m^2/g$))     (3)

[Metallic Impurity and Chlorine Content of Silica Particles]

The metallic impurity (Na, Fe) content and the chlorine content of each of the silica sols [1] to [5] produced in Production Examples 1 to 5 were determined in the following manner. Specifically, the metallic impurity was determined by dissolving silica sol in a platinum dish with diluted nitric acid and hydrofluoric acid, drying the solution to solid, adding diluted nitric acid to the platinum dish, and analyzing the resultant liquid through ICP emission analysis. The chloride ion was determined by diluting a silica sol and subjecting the liquid to anion chromatography. Table 1 shows the results.

TABLE 1

|  | Prodn. Exs. | | | | | Commercial product | |
| --- | --- | --- | --- | --- | --- | --- | --- |
|  | 1 | 2 | 3 | 4 | 5 | | |
| Silica | sol [1] | sol [2] | sol [3] | sol [4] | sol [5] | particle [6] | sol [7] |
| Si alkoxide | TEOS | TMOS | TMOS | TMOS | TEOS | — | — |
| Hydrolysis catalyst | $NH_3$ | $NH_3$ | $NH_3$ | TMAH | $NH_3$ | — | — |
| Temp. | 90 | 80 | 80 | 80 | 85 | — | — |
| Sp. surface area ($m^2/g$) | 99 | 200 | 91 | 92 | 129 | 141 | 81 |
| BET particle size D1 (nm) | 27.5 | 13.6 | 29.9 | 29.6 | 21.0 | — | 33.5 |
| D2/D1 | 1.46 | 1.25 | 1.40 | 1.49 | 1.40 | — | 2.24 |
| Percent moisture absorption (%) | 3.2 | 6.0 | 2.0 | 2.5 | 4.3 | — | 8.4 |
| Moisture absorption amount per surface area ($mg/m^2$) | 0.32 | 0.30 | 0.22 | 0.28 | 0.33 | — | 1.04 |
| Na (ppm) | <1 | <1 | <1 | <1 | <1 | — | <1 |
| Fe (ppm) | <1 | <1 | <1 | <1 | <1 | — | <1 |
| Cl (ppm) | <2 | <2 | <2 | <2 | <2 | — | <2 |

Commercial silica particles [6]: "Aerosil R711" (product of Nippon Aerosil Co., Ltd.)
Commercial silica sol [7]: "Quartron PL-3" (product of Fuso Chemical Co., Ltd.)

<Surface Modification of Silica Particles>

[Production Example 6] MMA-Dispersed Silica Sol [1]

To a 1-L glass container equipped with a stirrer and a condenser, silica sol [1] produced in Production Example 1 (300 g), methanol (30 g), and 28-mass % aqueous ammonia (0.1 g) were added. Then, methacryloxypropyltrimethoxysilane ("KBM-503," product of Shin-Etsu Chemical Co., Ltd.) (6.3 g) was added to the above mixture under stirring.

The sol was heated to 95° C. Subsequently, while methanol gas, separately prepared through boiling in another container, was fed into the sol in the reaction container, methanol-water mixture was distilled out, to thereby yield a methanol-dispersed silica sol ($SiO_2$ concentration: 25.0 mass %, water content: 0.9 mass %). The methanol-dispersed sol was transferred to a 1-L round-bottom (egg-plant shape) flask, and solvent substitution was performed through distillation under reduced pressure at 20.0 to 13.3 kPa, while methyl methacrylate (hereinafter abbreviated as MMA) was added thereto, to thereby yield 200 g of an MMA-dispersed silica sol [1] ($SiO_2$ concentration: 30.5 mass %, methanol concentration: 0.3 mass %, water content: 0.1 mass %).

[Production Example 7] MEK-Dispersed Silica sol [2]

To the same reaction container as employed in Production Example 6, silica sol [2] produced in Production Example 2 (380 g) and methanol (40 g) were added. Then, tri-n-propylamine (0.2 g) and phenyltrimethoxysilane ("KBM-103," product of Shin-Etsu Chemical Co., Ltd.) (3.1 g) were added to the above mixture under stirring. Subsequently, while methanol gas, separately prepared in the same manner as employed in Production Example 6, was fed into the sol, methanol-water mixture was distilled out, to thereby yield 446 g of a methanol-dispersed silica sol ($SiO_2$ concentration: 21.7 mass %, water content: 0.5 mass %).

To the methanol-dispersed sol (400 g), tri-n-propylamine (0.3 g) and phenyltrimethoxysilane (14.0 g) were added, and the resultant mixture was heated for 2 hours under stirring, with the liquid temperature being maintained at 60° C. Then, the entirety of the reaction mixture was transferred to a 1-L round-bottom (egg-plant shape) flask, and solvent substitution was performed through distillation under reduced pressure at 60.0 to 53.3 kPa, while methyl ethyl ketone (hereinafter abbreviated as MEK) was added thereto, to thereby yield an MEK-dispersed silica sol [2] ($SiO_2$ concentration: 27.1 mass %, methanol concentration: 0.5 mass %, water content: 0.1 mass %).

[Production Example 8] MEK-Dispersed Silica Sol [3]

To the same reaction container as employed in Production Example 6, silica sol [3] produced in Production Example 3 (400 g) and methanol (40 g) were added. Then, phenyltrimethoxysilane ("KBM-103," product of Shin-Etsu Chemical Co., Ltd.) (1.5 g) was added to the above mixture under stirring. Subsequently, while methanol gas, separately prepared in the same manner as employed in Production Example 6, was fed into the sol, methanol-water mixture was distilled out, to thereby yield 415 g of a methanol-dispersed silica sol ($SiO_2$ concentration: 24.3 mass %, water content: 0.2 mass %).

To the methanol-dispersed sol (343 g), tri-n-propylamine (0.3 g) and phenyltrimethoxysilane (6.1 g) were added, and the resultant mixture was heated for 2 hours under stirring, with the liquid temperature being maintained at 60° C. Then, the entirety of the reaction mixture was transferred to a 1-L round-bottom (egg-plant shape) flask, and solvent substitution was performed through distillation under reduced pressure at 60.0 to 53.3 kPa, while MEK was added thereto, to thereby yield an MEK-dispersed silica sol [3] ($SiO_2$ concentration: 24.6 mass %, methanol concentration: 0.4 mass %, water content: 0.2 mass %).

[Production Example 9] MEK-Dispersed Silica sol [4]

To the same reaction container as employed in Production Example 6, silica sol [4] produced in Production Example 4 (475 g) and methanol (48 g) were added. Then, phenyltrimethoxysilane ("KBM-103," product of Shin-Etsu Chemical Co., Ltd.) (1.5 g) was added to the above mixture under stirring. Subsequently, while methanol gas, separately prepared in the same manner as employed in Production Example 6, was fed into the sol, methanol-water mixture was distilled out, to thereby yield 485 g of a methanol-dispersed silica sol ($SiO_2$ concentration: 20.5 mass %, water content: 0.5 mass %).

To the methanol-dispersed sol (470 g), tri-n-propylamine (0.04 g) and phenyltrimethoxysilane (7.3 g) were added, and the resultant mixture was heated for 2 hours under stirring, with the liquid temperature being maintained at 60° C. Then, the entirety of the reaction mixture was transferred to a 1-L round-bottom (egg-plant shape) flask, and solvent substitution was performed through distillation under reduced pressure at 60.0 to 53.3 kPa, while MEK was added thereto, to thereby yield an MEK-dispersed silica sol [4] ($SiO_2$ concentration: 24.7 mass %, methanol concentration: 0.2 mass %, water content: 0.1 mass %).

[Production Example 10] Hydrophobic Silica Powder [5]

To a 1-L glass reactor equipped with a stirrer and a condenser, silica sol [5] produced in Production Example 5 (300 g), and isopropyl alcohol (90 g) was added thereto, to thereby prepare a mixed solvent silica sol having a silica concentration of 20.0 mass %. The mixed solvent silica sol was heated to 65° C., and hexamethyldisilazane (45 g) was added dropwise thereto. The thus-treated mixed solvent silica sol was mixed for 30 minutes and heated at 70° C. for one hour, to thereby prepare a slurry dispersion of hydrophobicized colloidal silica.

Subsequently, the slurry dispersion of hydrophobicized colloidal silica was aged for 3 hours under reflux and stirring, to thereby granulate silica. The hydrophobicized colloidal silica in granule form was separated from the liquid phase by means of a Buchner funnel (with qualitative filter paper No. 131, product of ADVANTEC), and the thus-obtained cake of the hydrophobicized colloidal silica in granule form was dried under reduced pressure at 80° C.

The thus-dried hydrophobicized colloidal silica in granule form was pulverized by means of a powder mill, and the powder was further dried at 150° C., to thereby yield 80 g of a hydrophobic silica powder [5]. The hydrophobic silica powder was found to have an $SiO_2$ concentration of 96.5 mass % and a water content of 0.3 mass %.

[Production Example 11] Comparative MEK-Dispersed Silica Sol

To the same reaction container as employed in Production Example 6, commercial water-dispersed silica sol [7] (tradename "Quartron PL-3," product of Fuso Chemical Co., Ltd., $SiO_2$ concentration: 19.5%) (530 g) and methanol (53 g) were added. Then, tri-n-propylamine (0.04 g) and phenyltrimethoxysilane ("KBM-103," product of Shin-Etsu Chemical Co., Ltd.) (1.3 g) were added to the above mixture under stirring.

Subsequently, while methanol gas, separately prepared in the same manner as employed in Production Example 6, was fed into the sol, methanol-water mixture was distilled out, to thereby yield a methanol-dispersed silica sol ($SiO_2$ concentration: 20.6 mass %, water content: 1.5 mass %). To the methanol-dispersed sol (446 g), phenyltrimethoxysilane (5.9 g) was added, and the resultant mixture was heated for 2 hours under stirring at 60° C.

Then, tri-n-propylamine (0.023 g) was added the mixture, and solvent substitution was performed through distillation under reduced pressure at 60.0 to 53.3 kPa, while MEK was added thereto, to thereby yield a comparative MEK-dispersed silica sol [6] ($SiO_2$ concentration: 24.5 mass %, methanol concentration: 0.1 mass %, water content: 0.2 mass %).

<Assessing of Characteristic of Surface-Modified Silica>
[Percent Moisture Absorption]

Percent moisture absorption of each of MMA-dispersed silica sol [1], MEK-dispersed silica sols [2] to [4], hydrophobic silica powder [5], and comparative MEK-dispersed silica sol [6], produced in Production Examples 6 to 11, was measured in a manner similar to that of Production Examples 1 to 5.

Table 2 shows the percent moisture absorption measurements of the surface-modified silicas produced in Production Examples 6 to 11, along with the percent moisture absorption measurements of the corresponding silica sols before surface modification.

TABLE 2

| Prodn. Exs. | 6 | 7 | 8 | 9 | 10 | 11 |
|---|---|---|---|---|---|---|
| Surface-treated silica | MMA sol [1] | MEK sol [2] | MEK sol [3] | MEK sol [4] | Silica powder [5] | Comp. Ex. MEK sol [6] |
| Raw silica | sol [1] | sol [2] | sol [3] | sol [4] | sol [5] | sol [7] |
| Percent moisture absorption (%) before surface treatment | 3.2 | 6.0 | 2.0 | 2.5 | 4.3 | 8.4 |
| Percent moisture absorption (%) after surface treatment | 1.2 | 1.2 | 1.2 | 1.7 | 1.0 | 6.9 |
| Relative drop in moisture absorption (before/after) | 2.7 | 5.0 | 1.7 | 1.5 | 3.6 | 1.2 |

As is clear from Table 2, MMA-dispersed silica sol [1], MEK-dispersed silica sols [2] to [4], and hydrophobic silica powder [5], produced in Production Examples 6 to 10, were found to have a percent moisture absorption of 3.0 mass % or less at a relative humidity of 50%, further 2.0 mass % or less. Such a percent moisture absorption indicates a moisture absorption property lower than that of comparative MEK-dispersed silica sol [6], produced in Production Example 11.

As is also clear from Table 2, MMA-dispersed silica sol [1], MEK-dispersed silica sols [2] to [4], and hydrophobic silica powder [5], produced in Production Examples 6 to 10, were found to exhibit a greater drop in percent moisture absorption (percent moisture absorption before surface modification/percent moisture absorption after surface modification), as compared with comparative MEK-dispersed silica sol [6], produced in Production Example 11.

<Production of Silica-Containing Resin Composition and Molded Article (Cured Resin Product)>

[Example 1] Silica-Containing Resin Composition [1A] and Cured Resin Product [1A]

2,2'-Azodiisobutyronitrile (product of Tokyo Chemical Industry Co., Ltd.) (0.1 parts by mass) was added to MMA-dispersed silica sol [1] produced in Production Example 6 (130 parts by mass), to thereby provide a silica-containing resin composition [1A]. The silica particle content of the silica-containing resin composition [1A] was adjusted to 43 parts by mass, with respect to 100 parts by mass of the resin.

The silica-containing resin composition [1A] was heated at 95° C. for one hour under stirring. Then, the composition was cast into a mold having dimensions of 4.5 cm (length)× 2.5 cm (width)×3 mm (thickness) and heated at 60° C. for 8 hours, at 80° C. for 2 hours, and 100° C. for 2 hours so as to cure the composition, to thereby produce a cured resin product [1A] ($SiO_2$ content: 43 parts by mass).

[Example 2] Silica-Containing Resin Composition [2A] and Cured Resin Product [2A]

MMA (Kanto Chemical Co., Inc.) (100 parts by mass) was mixed with 2,2'-azodiisobutyronitrile (product of Tokyo Chemical Industry Co., Ltd.) (0.1 parts by mass), hydrophobic silica powder [5] produced in Production Example 10 (30 parts by mass), and 3-methacryloxypropyltrimethoxysilane ("KBM-503," product of Shin-Etsu Chemical Co., Ltd.) (2.0 parts by mass), to thereby provide a silica-containing resin composition [2A]. The silica particle content of the silica-containing resin composition [2A] was adjusted to 29 parts by mass, with respect to 100 parts by mass of the resin.

The silica-containing resin composition [2A] was heated at 95° C. for one hour under stirring. Then, the composition was cast into a mold having dimensions of 4.5 cm (length)× 2.5 cm (width)×3 mm (thickness) and heated at 60° C. for 8 hours, at 80° C. for 2 hours, and 100° C. for 2 hours so as to cure the composition, to thereby produce a cured resin product [2A] ($SiO_2$ content: 29 parts by mass).

[Referential Example 1] Referential Resin Composition [1a] and Referential Cured Resin Product [1a]

2,2'-Azodiisobutyronitrile (product of Tokyo Chemical Industry Co., Ltd.) (0.1 parts by mass) was added to MMA (Kanto Chemical Co., Inc.) (100 parts by mass), to thereby provide a referential resin composition [1a]. The silica particle content of the referential resin composition [1a] was adjusted to 0 part by mass, with respect to 100 parts by mass of the resin.

The referential resin composition [1a] was heated at 95° C. for one hour under stirring. Then, the composition was cast into a mold having dimensions of 4.5 cm (length)×2.5 cm (width)×3 mm (thickness) and heated at 60° C. for 8 hours, at 80° C. for 2 hours, and 100° C. for 2 hours so as to cure the composition, to thereby produce a referential cured resin product [1a] ($SiO_2$ content: 0 part by mass).

Comparative Example 1

A commercial hydrophobic fumed silica ("AEROSIL (registered trademark) R711" methacryloxysilane-treated, product of Nippon Aerosil Co., Ltd.) was gradually added to to MMA (Kanto Chemical Co., Inc.) (100 parts by mass) under stirring. When 15 parts by mass of silica was added, the viscosity of the mixture considerably increased, making stirring difficult. As a result, silica was not able to be dispersed in MMA at high concentration.

[Example 3] Silica-Containing Resin Composition [3A] and Cured Resin Product [3A]

Bisphenol F-type epoxy resin ("YL-983U," Mitsubishi Chemical Corporation) (20 g) was mixed with MEK-dispersed silica sol [2] produced in Production Example 7 (22.2 g), and the solvent of the mixture was removed at 26.7 to 4.0 kPa, to thereby provide a silica sol containing bisphenol F-type epoxy resin as a dispersion medium ($SiO_2$ concentration: 23 mass %, viscosity (at 23° C.): 1,500 mPa·s).

Separately, 4-methylcyclohexane-1,2-dicarboxylic anhydride (20 g) was mixed with MEK-dispersed silica sol [2] produced in Production Example 7, and the solvent of the mixture was removed at 26.7 to 4.0 kPa, to thereby provide a silica sol containing 4-methylcyclohexane-1,2-dicarboxylic anhydride as a dispersion medium ($SiO_2$ concentration: 23 mass %, viscosity (at 50° C.): 680 mPa·s). The bisphenol F-type epoxy resin-dispersed sol (100 parts by mass) and 4-methylcyclohexane-1,2-dicarboxylic anhydride-dispersed sol (100 parts by mass) were combined. Then, tetra-n-butylsulfonium ("PX4ET," product of Nippon Chemical Industrial Co., Ltd.) (0.0073 parts by mass) was added there to as a curing accelerator with sufficient mixing, to thereby provide a silica-containing resin composition [3A]. The silica particle content of the silica-containing resin composition [3A] was adjusted to 30 parts by mass, with respect to 100 parts by mass of the resin.

The silica-containing resin composition [3A] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a cured resin product [3A] ($SiO_2$ content: 30 parts by mass).

[Example 4] Silica-Containing Resin Composition [4A] and Cured Resin Product [4A]

Bisphenol F-type epoxy resin ("YL-983U," Mitsubishi Chemical Corporation) (45 g) was mixed with MEK-dispersed silica sol [4] produced in Production Example 9 (81 g), and the solvent of the mixture was removed at 26.7 to 4.0 kPa, to thereby provide a silica sol containing bisphenol F-type epoxy resin as a dispersion medium ($SiO_2$ concentration: 30.5 mass %, MEK concentration: 0.1 mass %, viscosity (at 23° C.) 1,060 mPa·s).

To the thus-produced bisphenol epoxy resin-dispersed sol (100 parts by mass), 4-methylcyclohexane-1,2-dicarboxylic anhydride (70 parts by mass) serving as a curing agent and tetra-n-butylsulfonium ("PX4ET," product of Nippon Chemical Industrial Co., Ltd.) (0.0068 parts by mass) serving as a curing accelerator were added, to thereby provide a silica-containing resin composition [4A]. The silica particle content of the silica-containing resin composition [4A] was adjusted to 21 parts by mass, with respect to 100 parts by mass of the resin.

The silica-containing resin composition [4A] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a cured resin product [4A] ($SiO_2$ content: 21 parts by mass).

[Example 5] Silica-Containing Resin Composition [5A] and Cured Resin Product [5A]

An alicyclic epoxy resin ("Celloxide 2021P," product of Daicel Corporation) (24.8 g) was mixed with MEK-dispersed silica sol [3] produced in Production Example 8 (67.1 g), and the solvent of the mixture was removed at 26.7 to 4.0 kPa, to thereby provide an alicyclic epoxy resin-dispersed silica sol ($SiO_2$ concentration: 40 mass %, MEK concentration: 0 mass %, viscosity (at 23° C.): 955 mPa·s).

To the thus-produced alicyclic epoxy resin-dispersed sol (100 parts by mass), 4-methylcyclohexane-1,2-dicarboxylic anhydride (72 parts by mass) serving as a curing agent and tetra-n-butylsulfonium ("PX4ET," product of Nippon Chemical Industrial Co., Ltd.) (0.0060 parts by mass) serving as a curing accelerator were added, to thereby provide a silica-containing resin composition [5A]. The silica particle content of the silica-containing resin composition [5A] was adjusted to 30 parts by mass, with respect to 100 parts by mass of the resin.

The silica-containing resin composition [5A] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a cured resin product [5A] ($SiO_2$ content: 20 parts by mass).

[Example 6] Silica-Containing Resin Composition [6A] and Cured Resin Product [6A]

An alicyclic epoxy resin ("Celloxide 2021P," product of Daicel Corporation) (45 g) was mixed with MEK-dispersed silica sol [4] produced in Production Example 9 (80 g), and the solvent of the mixture was removed at 26.7 to 4.0 kPa, to thereby provide an alicyclic epoxy resin-dispersed silica sol ($SiO_2$ concentration: 30.4 mass %, MEK concentration: 0.2 mass %, viscosity (at 23° C.): 600 mPa·s).

To the thus-produced alicyclic epoxy resin-dispersed sol (100 parts by mass), 4-methylcyclohexane-1,2-dicarboxylic anhydride (83 parts by mass) serving as a curing agent and tetra-n-butylsulfonium ("PX4ET," product of Nippon Chemical Industrial Co., Ltd.) (0.0068 parts by mass) serving as a curing accelerator were added, to thereby provide a silica-containing resin composition [6A]. The silica particle content of the silica-containing resin composition [6A] was adjusted to 30 parts by mass, with respect to 100 parts by mass of the resin.

The silica-containing resin composition [6A] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a cured resin product [6A] ($SiO_2$ content: 20 parts by mass).

[Referential Example 2] Referential Resin Composition [2a] and Referential Cured Resin Product [2a]

A bisphenol F-type epoxy resin-dispersed sol (100 parts by mass) was mixed with 4-methylcyclohexane-1,2-dicarboxylic anhydride (100 parts by mass), and tetra-n-butylsulfonium ("PX4ET," product of Nippon Chemical Industrial Co., Ltd.) (0.0068 parts by mass) serving as a curing accelerator was added to the mixture, to thereby provide a referential resin composition [2a]. The silica particle content of the referential resin composition [2a] was adjusted to 0 part by mass, with respect to 100 parts by mass of the resin.

The referential resin composition [2a] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a referential cured resin product [2a] ($SiO_2$ content: 0 part by mass).

[Referential Example 3] Referential Resin Composition [3a] and Referential Cured Resin Product [3a]

An alicyclic epoxy resin-dispersed sol (100 parts by mass) was mixed with 4-methylcyclohexane-1,2-dicarboxylic anhydride (120 parts by mass), and tetra-n-butylsulfonium ("PX4ET," product of Nippon Chemical Industrial Co., Ltd.) (0.0068 parts by mass) serving as a curing accelerator was added to the mixture, to thereby provide a referential resin composition [3a]. The silica particle content of the referential resin composition [3a] was adjusted to 0 part by mass, with respect to 100 parts by mass of the resin.

The referential resin composition [3a] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a referential cured resin product [3a] ($SiO_2$ content: 0 part by mass).

[Comparative Example 2] Comparative Silica-Containing Resin Composition [2B] and Comparative Cured Resin Product [2B]

Bisphenol F-type epoxy resin ("YL-983U," Mitsubishi Chemical Corporation) (45 g) was mixed with comparative MEK-dispersed silica sol [6] produced in Production Example 11 (80 g), and the solvent of the mixture was removed at 26.7 to 4.0 kPa, to thereby provide a silica sol containing bisphenol F-type epoxy resin as a dispersion medium ($SiO_2$ concentration: 30.5 mass %, MEK concentration: 0.1 mass %, viscosity (at 50° C.): 1,450 mPa·s).

To the thus-produced bisphenol epoxy resin-dispersed sol (100 parts by mass), 4-methylcyclohexane-1,2-dicarboxylic anhydride (70 parts by mass) serving as a curing agent and tetra-n-butylsulfonium ("PX4ET," product of Nippon Chemical Industrial Co., Ltd.) (0.0068 parts by mass) serving as a curing accelerator were added, to thereby provide a comparative silica-containing resin composition [2B]. The silica particle content of the comparative silica-containing resin composition [2B] was adjusted to 21 parts by mass, with respect to 100 parts by mass of the resin.

The comparative silica-containing resin composition [2B] was cast into a mold having dimensions of 4.5 cm (length)×2.5 cm (width)×3 mm (thickness) and heated in a drier at 80° C. for 30 minutes, at 100° C. for 2 hours, and 150° C. for 4 hours, to thereby produce a comparative cured resin product [2B] ($SiO_2$ content: 21 parts by mass).

[Comparative Example 3] Comparative Silica-Containing Resin Composition [3B] and Comparative Cured Resin Product [3B]

An alicyclic epoxy resin ("Celloxide 2021P," product of Daicel Corporation) (46 g) was mixed with comparative MEK-dispersed silica sol [6] produced in Production Example 11 (81 g), and the solvent of the mixture was removed at 26.7 to 4.0 kPa, to thereby provide a silica sol containing an aliphatic epoxy resin as a dispersion medium ($SiO_2$ concentration: 40 mass %, MEK concentration: 0 mass %, viscosity (at 23° C.): 955 mPa·s).

To the thus-produced alicyclic epoxy resin-dispersed sol (100 parts by mass), 4-methylcyclohexane-1,2-dicarboxylic anhydride (83 parts by mass) serving as a curing agent and tetra-n-butylsulfonium ("PX4ET," product of Nippon Chemical Industrial Co., Ltd.) (0.0068 parts by mass) serving as a curing accelerator were added, to thereby provide a comparative silica-containing resin composition [3B]. The silica particle content of the comparative silica-containing resin composition [3B] was adjusted to 19 parts by mass, with respect to 100 parts by mass of the resin.

The comparative silica-containing resin composition [3B] was cast into a mold having dimensions of 4.5 cm (length)× 2.5 cm (width)×3 mm (thickness) and heated in a drier at 80° C. for 30 minutes, at 100° C. for 2 hours, and 150° C. for 4 hours, to thereby produce a comparative cured resin product [3B] (5102 content: 19 parts by mass).

<Assessing of Characteristic of Cured Resin Product>
[Transmittance]

Transmittance of each of cured resin products [1A] to [6A] produced in Examples 1 to 6, referential cured resin products [1a] to [3a], and comparative cured resin products [2B] and [3B] was measured at 550 nm by means of a spectrophotometer. Transmittance of the sample of Comparative Example 1 was not measurable.

[Percent Water Absorption]

Percent water absorption of each of cured resin products [1A] to [6A] produced in Examples 1 to 6, referential cured resin products [1a] to [3a], and comparative cured resin products [2B] and [3B] was measured in the following manner. Specifically, a cured resin product sample was allowed to stand in a drier oven at 50° C. for 24 hours, and the mass of the dried sample (mass (A)) was measured. Then, the sample was boiled at 100° C. under reflux for 3 hours, and the mass of the boiled sample (mass (B)) was measured. From masses (A) and (B), percent water absorption was calculated by the following formula [4]. Percent water absorption of the sample of Comparative Example 1 was not measurable.

[F4]

$$\text{Percent water absorption (mass \%)} = [(\text{mass } B - \text{mass } A)/\text{mass } A] \times 100 \quad (4)$$

[Coefficient of Thermal Linear Expansion (CTE)]

Coefficient of thermal linear expansion of each of cured resin products [3A] to [6A] produced in Examples 3 to 6, referential cured resin products [1a] to [3a], and comparative cured resin products [2B] and [3B] was measured. The measurement was performed according to JIS K-6911. Specifically, a test piece was obtained from each cured product, and the thickness thereof was measured. In the thermal mechanical analysis (TMA), a load of 0.05 N was applied, and temperature was elevated at 1° C./minute. A change in length in a temperature range of 30 to 80° C. is denoted by ΔL1, and the initial length of the test piece is denoted by L. Linear thermal expansion coefficient al was calculated by the following formula [5].

[F5]

$$\text{Linear thermal expansion coefficient } \alpha_1 \text{ (ppm/° C.)} = (\Delta L1/L) \times [1/(80-30)] \quad (5)$$

Table 3 shows the measurement results of cured resin products [1A] to [6A] produced in Examples 1 to 6, referential cured resin products [1a] to [3a], and comparative cured resin products [2B] and [3B].

As is clear from Table 3, in Examples 1 to 6, a considerable drop in moisture resistance or transparency can be prevented, whereby a cured resin product containing high-purity silica at high concentration can be produced, as compared with Comparative Examples 2 and 3.

As is also clear from Table 3, in Examples 1 to 6, a considerable drop in moisture resistance or transparency can be prevented, whereby a silica-containing resin composition which enables provision of a cured resin product containing high-purity silica at high concentration can be produced, as compared with Comparative Examples 2 and 3.

TABLE 3

|  | Ex. 1 | Ex. 2 | Ref. Ex. 1 | Comp. Ex. 1 | Ex. 3 | Ex. 4 | Ref. Ex. 2 | Comp. Ex. 2 | Ex. 5 | Ex. 6 | Ref. Ex. 3 | Comp. Ex. 3 |
|---|---|---|---|---|---|---|---|---|---|---|---|---|
| Silica | MMA sol [1] | Silica powder [5] | — | Comp. Ex. MEK sol [6] | MEK sol [2] | MEK sol [4] | — | Comp. Ex. MEK sol [6] | MEK sol [3] | MEK sol [4] | — | Comp. Ex. MEK sol [6] |
| Resin compn. | [1A] | [2A] | [1a] | — | [3A] | [4A] | [2a] | [2B] | [5A] | [6A] | [3a] | [3B] |
| Type of resin | PMMA | PMMA | PMMA | alicyclic EP | aromatic EP | aromatic EP | aromatic EP | aromatic EP | alicyclic EP | alicyclic EP | alicyclic EP | alicyclic EP |
| Cured resin | [1A] | [2A] | [1a] | — | [3A] | [4A] | [2a] | [2B] | [5A] | [6A] | [3a] | [3B] |
| $SiO_2$ content of cured resin (resin compn.) (parts by mass) | 43 | 29 | 0 | not measurable | 30 | 21 | 0 | 21 | 30 | 20 | 0 | 19 |
| Transmittance of cured product (%) | 82 | 84 | 86 |  | 75 | 59 | 87 | 4 | 76 | 78 | 85 | 19 |
| Percent water absorption of cured product (%) | 0.67 | 0.72 | 0.84 |  | 0.64 | 0.52 | 0.48 | 0.71 | 0.62 | 0.86 | 0.98 | 1.08 |
| Linear expansion coeff. of cured product (ppm/° C.) | — | — | — | — | 59 | 64 | 74 | 65 | 55 | 60 | 71 | 61 |

The invention claimed is:

1. A silica-containing resin composition, comprising a resin and surface-treated silica particles in an amount of 5 to 300 parts by mass, with respect to 100 parts by mass of the resin, wherein
   (a) the silica particles have a specific surface area, as determined through a nitrogen absorption method, of 20 to 500 m$^2$/g,
   (b) the silica particles have a percent moisture absorption of 5.0 mass % or less at 23° C. and a relative humidity of 50%,
   (c) the silica particles contain substantially no metallic impurity or halogen,
   (d) the silica particles have a moisture absorption amount per surface area thereof of 0.5 mg/m$^2$ or less at 23° C. and a relative humidity of 50%,
   (e) the silica particles have a ratio (D2/D1) of mean particle size (D2) measured through dynamic light scattering to mean particle size (D1) measured through the BET method of 1.6 or lower, and
   (f) the surface-treated silica particles are produced, without firing of the silica particles, by a method that comprises:
   hydrolyzing a silicon alkoxide in water and an optional hydrophilic organic solvent as a reaction medium in the presence of a hydrolysis catalyst, with the temperature of the reaction medium being 60° C. or higher and the ratio by mole of water to silicon (H$_2$O/Si) being maintained at 25 or higher, to obtain the silica particles, wherein the hydrolysis catalyst is at least one member selected from the group consisting of ammonia, primary to tertiary amines, and a quaternary ammonium; and
   modifying surfaces of the silica particles with hydrolysis products and/or hydrolysis condensation products of an organic silane compound in water and/or a hydrophilic organic solvent.

2. The silica-containing resin composition according to claim 1, wherein the surface-treated silica particles have undergone organophilization with the organic silane compound at ≥0.5 molecules per 1 nm$^2$ surface thereof.

3. The silica-containing resin composition according to claim 2, wherein the organic silane compound is at least one compound selected from the group consisting of alkoxysilane, silazane, siloxane, acetoxysilane, and silylurea.

4. The silica-containing resin composition according to claim 2, wherein the surface-modified silica particles have a percent moisture absorption of 3.0 mass % or less at 23° C. and a relative humidity of 50%.

5. A molded article formed of the silica-containing resin composition according to claim 1.

6. A method for producing a silica-containing resin composition, the method comprising:
   forming surface-treated silica particles without firing of the silica particles; and
   incorporating the silica particles into a resin in an amount of 5 to 300 parts by mass, with respect to 100 parts by mass of the resin, wherein forming the surface-treated silica particles includes:
   hydrolyzing a silicon alkoxide in water and an optional hydrophilic organic solvent as a reaction medium in the presence of a hydrolysis catalyst, with the temperature of the reaction medium being 60° C. or higher and the ratio by mole of water to silicon (H$_2$O/Si) being maintained at 25 or higher, to obtain the silica particles, wherein the hydrolysis catalyst is at least one member selected from the group consisting of ammonia, primary to tertiary amines, and a quaternary ammonium; and
   modifying surfaces of the silica particles with hydrolysis products and/or hydrolysis condensation products of an organic silane compound in water and/or a hydrophilic organic solvent; and wherein the silica particles have
a moisture absorption amount per surface area thereof of 0.5 mg/m$^2$ or less at 23° C. and a relative humidity of 50%,
a specific surface area, as determined through a nitrogen absorption method, of 20 to 500 m$^2$/g, and
a ratio (D2/D1) of mean particle size (D2) measured through dynamic light scattering to mean particle size (D1) measured through the BET method of 1.6 or lower.

7. The method according to claim 6, wherein the organic silane compound is present at ≥0.5 molecules per 1 nm$^2$ surface of the silica particles.

8. A molded article formed of the silica-containing resin composition according to claim 2.

9. A molded article formed of the silica-containing resin composition according to claim 3.

10. A molded article formed of the silica-containing resin composition according to claim 4.

11. A method for producing a silica-containing resin composition, the method comprising:
    forming surface-treated silica particles; and
    incorporating the silica particles into a resin in an amount of 5 to 300 parts by mass, with respect to 100 parts by mass of the resin, wherein forming the surface-treated silica particles consists essentially of:
    hydrolyzing a silicon alkoxide in water and an optional hydrophilic organic solvent as a reaction medium in the presence of a hydrolysis catalyst, with the temperature of the reaction medium being 60° C. or higher and the ratio by mole of water to silicon (H$_2$O/Si) being maintained at 25 or higher, to obtain the silica particles, wherein the hydrolysis catalyst is at least one member selected from the group consisting of ammonia, primary to tertiary amines, and a quaternary ammonium; and
    modifying surfaces of the silica particles with hydrolysis products and/or hydrolysis condensation products of an organic silane compound in water and/or a hydrophilic organic solvent; and
wherein the silica particles have
a moisture absorption amount per surface area thereof of 0.5 mg/m$^2$ or less at 23° C. and a relative humidity of 50%,
a specific surface area, as determined through a nitrogen absorption method, of 20 to 500 m$^2$/g, and
a ratio (D2/D1) of mean particle size (D2) measured through dynamic light scattering to mean particle size (D1) measured through the BET method of 1.6 or lower.

* * * * *